Figure 1:
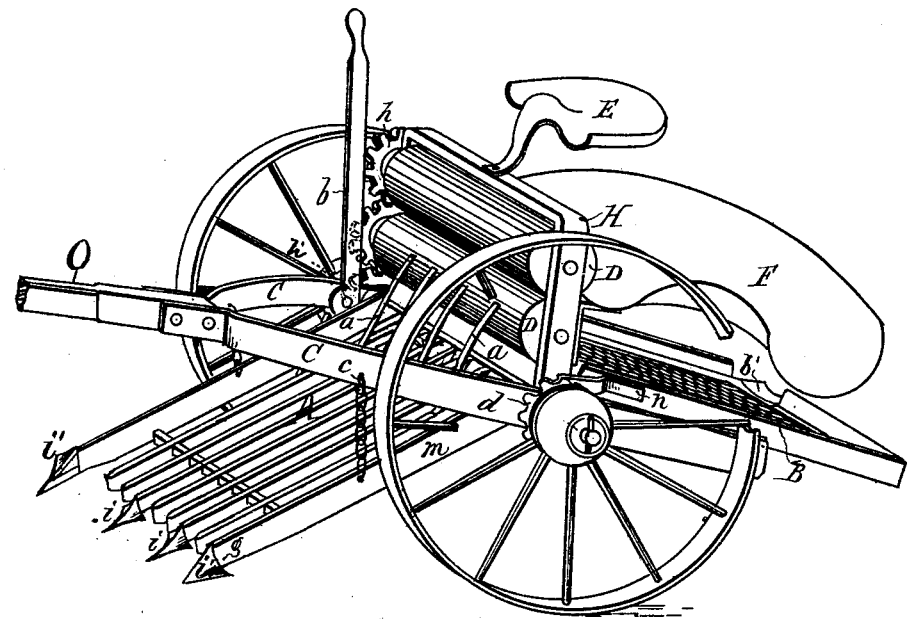

J. P. MAULL.
POTATO-DIGGER.

No. 189,568. Patented April 17, 1877.

Witnesses:
Marcus J. Wright
Chas. E. Ware

Inventor:
Joseph P. Maull.
By Jos. E. Ware, Attorney

UNITED STATES PATENT OFFICE.

JOSEPH P. MAULL, OF ST. LOUIS, MISSOURI.

IMPROVEMENT IN POTATO-DIGGERS.

Specification forming part of Letters Patent No. 189,568, dated April 17, 1877; application filed November 2, 1876.

*To all whom it may concern:*

Be it known that I, JOSEPH P. MAULL, of St. Louis, in the county of St. Louis and State of Missouri, have invented a new and useful Improvement in Potato-Diggers, which improvement is fully set forth in the following specification, reference being had to the accompanying drawings.

The object of my invention is to supply the agriculturist with a more perfect potato-digger, which is also quite as efficient as a cotton-stalk extractor and gatherer.

My machine is suspended on the axle of what is known in agriculture as a pair of buggy-wheels, and has a hinged movable apron upon the said axle. The axle also sustains a seat-arch, which, with the hounds belonging to the tongue, are rigid parts of the axle, having no movement or play, except in the hubs of the wheels. The hounds are carried back in the rear of the axle sufficiently far to afford firm supports for a vibrating separator that hangs and plays freely on two pivot-bolts, that not only sustain the separator, but allows of a lateral shaking movement. The inner side of the hub of the near wheel is toothed or cam-formed, by which one turn of this wheel will communicate eight lateral vibrations to the separator by the action of the cams when the wheels are moving either way.

The separator is inclined obliquely from the axle toward a delivery-spout in one corner of the frame. A tendency of the separator to droop toward the rear is met by a bent balancing-plate near the shaking-bar.

A grated apron independently hung on the axle is provided with four small plows, and six or more splitting-bars. Two of the inside plows are double, and intended to penetrate underneath the portion of the row containing the potatoes. The outer pair of plows is single and reversible, and will cast the dirt in, so as to go on the apron if any potatoes are on the edges of the furrow; if not, the earth can be cast off into the centers, and relieve the apron of much stress.

The potatoes and stalks, with much cloddy earth, will be passed up the apron by the draft-force of the team. Much earth and most of the smaller valueless potatoes will drop between the bars, which are about one inch apart. The pressure of the stalks, potatoes, and clods will carry the whole mass up the main slope, the higher and steeper slope-bars, being set wider apart, will lead the stalks toward the gathering-rollers, which will pass them to the rear and one side over the conveyer, while the the potatoes and such clods as accompany them will drop between the bars and be forced into the throat underneath the lower roller and on the vibrating separator, to be separated one from the other, the clean potatoes falling on the ground in a row, or into a basket on a proper platform therefor. The rollers are moved by a cog-wheel that is attached to, and turned by the adhesion of, the off-wheel of the carriage or buggy, and which works the upper pair on the rollers. The cog-wheels are star-gearing to force large entangled bunches of stalks and roots to pass to the rear with certainty.

The driver's seat is firmly attached to the top of the arch, while within easy reach of his hand is a bent slotted lever for raising or dropping the apron and plows. A chain by any common method of adjustment regulates the depth of their action.

When the apron is raised for travel it is hung by a chain on the nigh side by hooking it into the side of the apron-frame.

Figure 2:
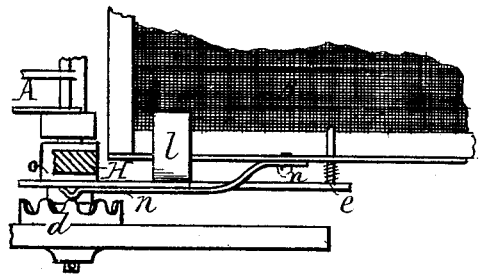
Figure 3:
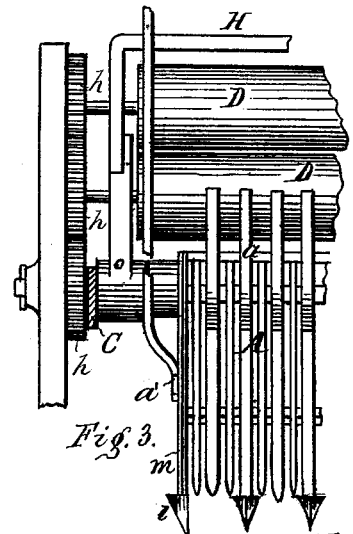

The machine is illustrated more in detail in the perspective view, Figure 1, and the partial view, Figs. 2 and 3.

A is the apron composed of grated bars, with plows in the middle, and also on the landsides of the apron-frame; $a$, ribs for turning the stalks up to the rollers; $a'$, relief-slot in bent lever used in raising the apron; B, separator; $b$, bent elevating-lever; $b'$, spout for clean gathered potatoes; C, hounds; $c$, chain to gage the depth and action of the apron; D, rollers for removal of stalks and roots; $d$, hub with vibrating cam; E, driver's seat; $e$, vibrator pivot and spring; F, conveyer for stalks and roots; H, arch to support the driver's seat and the rollers; $h$, geared wheels to rollers; $h'$, cog-wheel on off-hub; $i\ i$, double inside plows; $i'\ i'$, single reversible plows reversed by changing plows to opposite sides of apron land-side; *l*, balancing-plate for separator; *n*, vibrating bar; O, tongue; *o o*, connection of arch with axle.

I propose also to extract and gather cotton-stalks by my machine, by detaching the separator from the machine.

I do not claim the apron with double plows as my invention.

I claim—

1. The hounds C and arched frame H, in combination with the rollers D D, conveyer F, obliquely-inclined separator B, vibrating bar *n*, and cam *d*, all arranged and operating substantially as and for the purpose set forth.

2. The sloping apron, consisting of a series of finger-bars, the rear ends of which are hinged to the axle-tree, in combination with the rigidly-attached plows *i i* and the reversible plows *i' i'*, substantially as and for the purpose specified.

3. The dividing-fingers *a*, in combination with alternate sloping apron-bars, as and for the purpose specified.

JOSEPH P. MAULL.

Witnesses:
S. E. VAN ALEN,
YODER BROWN.